(12) United States Patent
Kotecha et al.

(10) Patent No.: US 10,805,810 B2
(45) Date of Patent: Oct. 13, 2020

(54) MOBILE DEVICE ASSISTED OPTIMIZATION OF A WIRELESS NETWORK

(71) Applicant: Verizon Patent and Licensing, Inc., Arlington, VA (US)

(72) Inventors: Lalit R. Kotecha, San Ramon, CA (US); Rakesh H Chandwani, Freehold, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 232 days.

(21) Appl. No.: 14/051,419

(22) Filed: Oct. 10, 2013

(65) Prior Publication Data
US 2015/0105094 A1     Apr. 16, 2015

(51) Int. Cl.
| | |
|---|---|
| *H04W 24/02* | (2009.01) |
| *H04L 12/859* | (2013.01) |
| *H04W 28/02* | (2009.01) |
| *H04L 12/801* | (2013.01) |
| *H04L 12/815* | (2013.01) |

(52) U.S. Cl.
CPC ............ *H04W 24/02* (2013.01); *H04L 47/14* (2013.01); *H04L 47/22* (2013.01); *H04L 47/2475* (2013.01); *H04L 47/29* (2013.01); *H04W 28/02* (2013.01); *H04W 28/0231* (2013.01)

(58) Field of Classification Search
CPC ..... H04L 47/22; H04L 47/2475; H04L 47/29; H04L 47/11; H04L 47/14; H04L 47/20; H04L 65/80; H04L 41/0896; H04L 47/2483; H04L 43/16; H04L 47/2441; H04L 47/803; H04L 43/0876; H04W 24/02; H04W 28/02; H04W 28/0231; H04W 24/08; H04W 28/0289; H04W 28/10; H04W 28/0284
See application file for complete search history.

(56) References Cited

U.S. PATENT DOCUMENTS

| | | | |
|---|---|---|---|
| 2006/0198359 A1* | 9/2006 | Fok | H04W 24/10 370/351 |
| 2010/0279681 A1* | 11/2010 | Ahmad | H04W 24/08 455/424 |
| 2012/0047096 A1* | 2/2012 | Duffield | H04L 43/045 706/12 |
| 2012/0250570 A1* | 10/2012 | Parker | H04L 43/0882 370/253 |

(Continued)

*Primary Examiner* — Nam T Huynh (57) ABSTRACT

Traffic flows in a wireless network may be optimized based on a current state of the wireless network as well as based on information received from mobile devices attached to the wireless network. In one implementation, a method may include receiving, from mobile devices attached to the wireless network, values for parameters associated with applications that are executed by the mobile devices. The method may further include receiving, from network elements in the wireless network, information relating to a state of the wireless network; and determining based on the values for the parameters associated with the applications and based on the information relating to the state of the wireless network, modifications to an operation of the wireless network to optimize transmission of the traffic flows in the wireless network with respect to the parameters.

20 Claims, 9 Drawing Sheets

(56) References Cited

U.S. PATENT DOCUMENTS

| | | | | |
|---|---|---|---|---|
| 2012/0324091 A9* | 12/2012 | Raleigh | ............... | H04L 41/0893 |
| | | | | 709/224 |
| 2014/0022904 A1* | 1/2014 | Ahmad | ............. | H04W 28/0289 |
| | | | | 370/235 |
| 2014/0228017 A1* | 8/2014 | Chang | ................... | H04W 24/10 |
| | | | | 455/422.1 |

* cited by examiner

| Application | Desired BW | Latency | Jitter | Actual BW | Latency | Jitter |
|---|---|---|---|---|---|---|
| Video Streaming App | 2 Mbps | 10 ms | 8 ms | 1.5 Mbps | 6 ms | 8 ms |
| Audio Streaming App | 20 Kbps | 10 ms | 8 ms | 40 Kbps | 6 ms | 4 ms |
| FTP App | 1 Mbps | 15 ms | 8 ms | 1 Mbps | 15 ms | 4 ms |

500

| Mobile Device ID | Application | Desired | | | Actual | | |
|---|---|---|---|---|---|---|---|
| | | BW (520) | Latency (525) | Jitter (530) | BW (535) | Latency (540) | Jitter (545) |
| 703-555-1111 | Video Streaming App | 2 Mbps | 10 ms | 8 ms | 1.5 Mbps | 6 ms | 8 ms |
| 703-555-1111 | Audio Streaming App | 20 Kbps | 10 ms | 8 ms | 40 Kbps | 6 ms | 4 ms |
| 703-555-1111 | FTP App | 1 Mbps | 15 ms | 8 ms | 1 Mbps | 15 ms | 4 ms |
| 609-555-1212 | Video Streaming App | 2 Mbps | 10 ms | 8 ms | 2.0 Mbps | 10 ms | 7 ms |

(510: Mobile Device ID, 515: Application)

| Network Element ID (515) | Radio Resource Usage (520) | QCI (525) |
|---|---|---|
| Base Station 1 | 10% | 1 |
| Base Station 1 | 20% | 2 |
| Base Station 1 | 60% | All |
| Base Station 2 | 95% | All |

MOBILE DEVICE ASSISTED OPTIMIZATION OF A WIRELESS NETWORK

BACKGROUND

Wireless networks, such as cellular wireless networks, may provide network connectivity to mobile devices, such as smart phones. Wireless networks are increasingly becoming data centric networks that are used for data intensive applications, such as streaming video. Data intensive applications may require a continuous bandwidth for a sustained duration.

It may be desirable to optimize the delivery of traffic to mobile devices that are attached to the wireless network. The optimizations may include, for example, modifying network parameters to adjust the performance of traffic flows in the network. In some existing networks, the optimizations may be based on network conditions (e.g., congestion) that are detected by the network devices that implement the wireless network.

DETAILED DESCRIPTION OF PREFERRED EMBODIMENTS

The following detailed description refers to the accompanying drawings. The same reference numbers in different drawings may identify the same or similar elements.

Techniques described herein may provide for the optimization of traffic flows in a wireless network. The optimization may be based on a current state of the wireless network (as determined by congestion information, latency information, parameters relating to the operation of network devices, etc.), as well as on information received from mobile devices attached to the wireless network. The information received from the mobile devices may be information relating to the performance of various applications that are being executed by the mobile devices.

Figure 1:
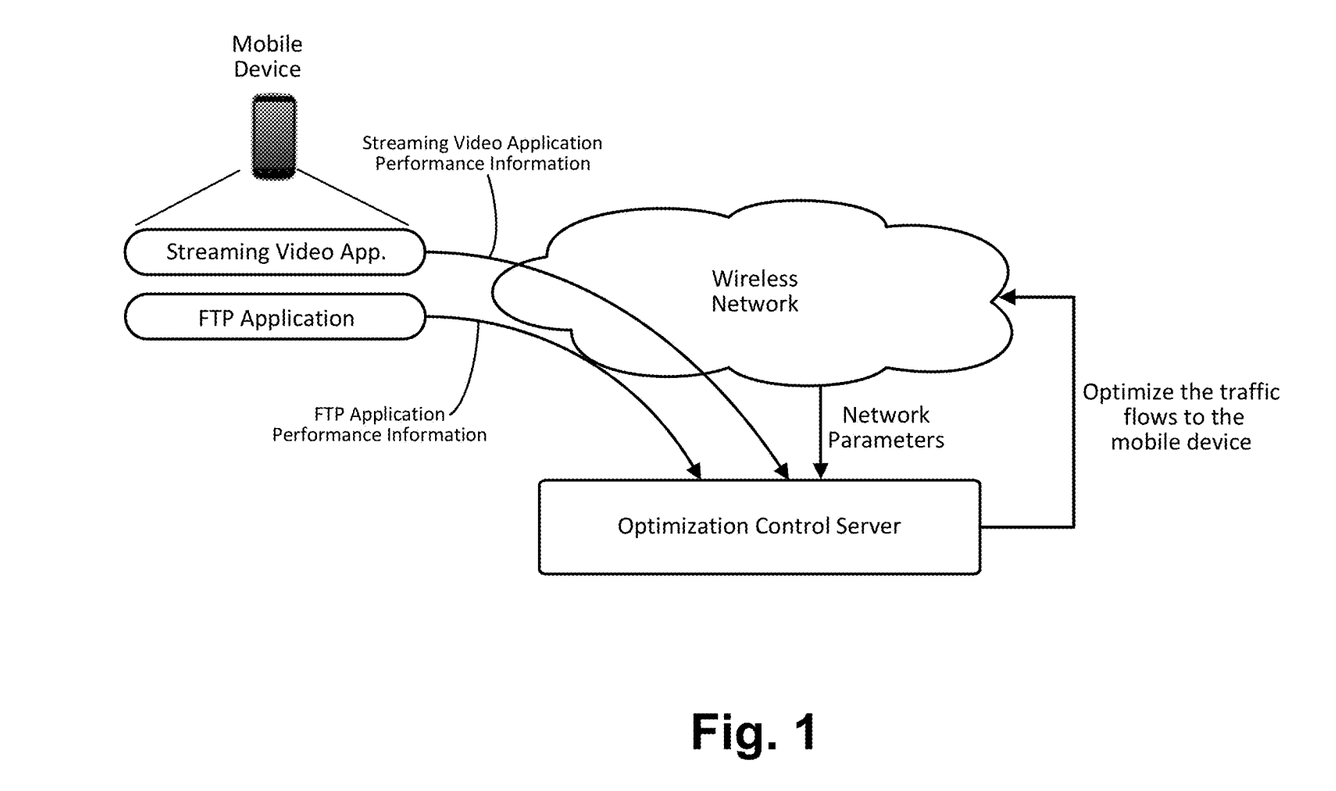
FIG. 1 is a diagram conceptually illustrating an example of an overview of concepts described herein.

FIG. 1 is a diagram conceptually illustrating an example of an overview of concepts described herein. As shown in FIG. 1, a mobile device may be attached to a wireless network (e.g., a wireless cellular network). In this example, the mobile device may be executing a streaming video application (e.g., to present a video to a user of the mobile device) and a file transfer protocol (FTP) application (e.g., to download a file to the mobile device). The applications may each be associated with a traffic flow (e.g., a dedicated bearer connecting the mobile device to a network external to the wireless network). Each traffic flow may be quantified by a number of performance parameters, such as parameters relating to bandwidth, latency, and jitter of packets transmitted using the traffic flow. The mobile device may measure and/or monitor values for the performance parameters.

The traffic flows may also be associated with desired or target performance parameter values, such as a desired bandwidth value, a desired latency value, and a desired jitter value. For example, the streaming video application may require a traffic flow with a relatively high bandwidth value and low latency value. The FTP application, in contrast, may be a less time critical application that can function acceptably with a lower bandwidth value and increased latency value.

An optimization control server, as illustrated in FIG. 1, may be associated with the wireless network. The mobile device may transmit the measured performance parameter values for each of the applications to the optimization control server ("Streaming Video Application Performance Information" and "FTP Application Performance Information"). Information relating to the operation of the wireless network ("Network Parameters"), such as values received from base stations, routers, or other network devices that are part of the wireless network, may also be received by the optimization control server. The optimization control server may use the parameter values from the mobile device (i.e., the "Streaming Video Application Performance Information" and the "FTP Application Performance Information") and the information relating to the operation of the wireless network (i.e., the "Network Parameters") to optimize the traffic flows for the mobile device.

As an example of the operation of the optimization control server, consider the situation in which a number of mobile devices are attached (e.g., via a radio interface) to a base station of the wireless network and are each executing a video application to receive a video stream. Further, assume that the optimization control server determines that the radio interface of the base station is overloaded or congested. To relieve the congestion, the optimization control server may modify parameters associated with one or more of the traffic flows such that the bandwidth that is used by the traffic flows, corresponding to the video applications, is reduced to a level that reduces the radio interface congestion but is still acceptable for the video application. Traffic flows associated with other applications being executed by the mobile devices may be unaffected. In this manner, the optimization control server may optimize network traffic based on information from the mobile devices (e.g., information relating to the applications being executed by the mobile devices).

Figure 2:
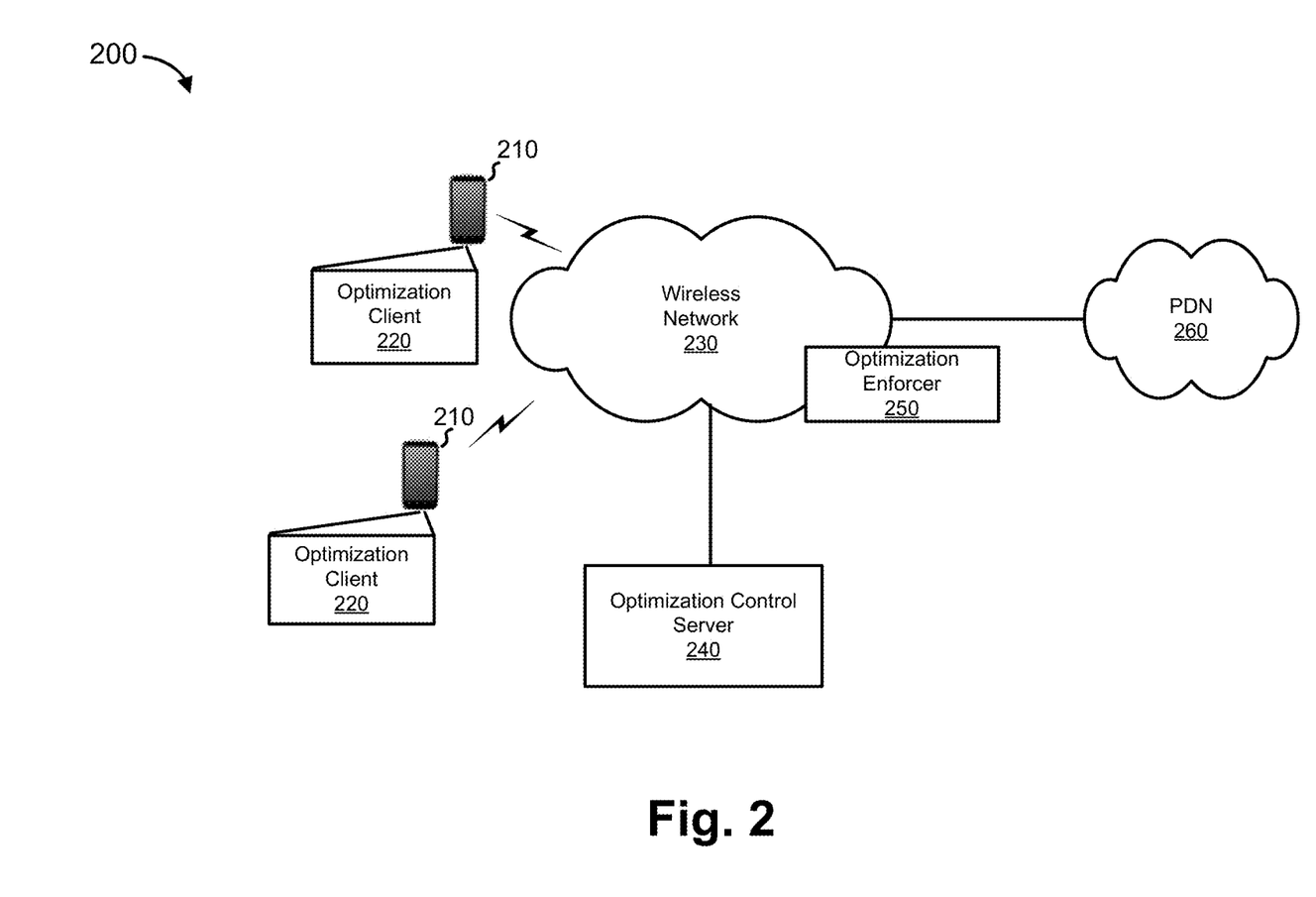
FIG. 2 is a diagram of an example environment in which systems and/or methods described herein may be implemented.

FIG. 2 is a diagram of an example environment 200 in which systems and/or methods described herein may be implemented. As illustrated, environment 200 may include one or more mobile devices 210 (which may each implement an optimization client 220), wireless network 230, optimization control server 240, optimization enforcer 250, and packet data network (PDN) 260.

Mobile devices 210 may include portable computing and communication devices, such as a personal digital assistant (PDA), a smart phone, a cellular phone, a laptop computer with connectivity to a cellular wireless network, a tablet computer, etc. Mobile devices 210 may also include non-portable computing devices, such as desktop computers, consumer or business appliances, set-top devices (STDs), or other devices that have the ability to connect to wireless network 230. Mobile devices 210 may connect, through a radio link, to wireless network 230.

Mobile devices 210 may each execute one or more processes, represented as optimization clients 220, that provide application performance information (e.g., parameter values corresponding to traffic flows used by applications executed by mobile device 210) to optimization control server 240. Each optimization client 220 may include, for example, a process implemented at a middleware or operating system layer in mobile device 210. Alternatively, each optimization client 220 may be implemented in hardware or as a combination of hardware and software. In one implementation, optimization client 220 may be installed during the manufacture or provisioning of mobile device 210. Alternatively, optimization client 220 may be installed by a user of mobile device 210. The operation of optimization client 220 will be described in more detail below.

Wireless network 230 may include one or more networks that provide wireless network connectivity to mobile devices 210. For example, wireless network 230 may represent a wireless network that provides cellular wireless coverage. In some implementations, and as described in more detail below, wireless network 230 may be associated with a Long Term Evolution (LTE) network. A radio access network (RAN) associated with wireless network 230 may include one or more base stations, some or all of which may take the form of an evolved node B (eNB).

Optimization control server 240 may include one or more computation and communication devices that receive metrics, relating to the operation of environment 200, from mobile devices 210 and from network elements in wireless network 230. In particular, optimization control server 240 may receive values for performance parameters, from optimization clients 220, that relate to traffic flows (e.g., data connections) that are used by various applications that are being executed by mobile devices 210. As previously mentioned, the performance parameters for each traffic flow may include measured values relating to bandwidth, latency, and/or jitter of the traffic flow.

Optimization control server 240 may also receive information relating to a state of the operation of wireless network 230 (e.g., and from network elements in wireless network 230). In one implementation, optimization control server 240 may receive information relating to network congestion or latency, or tunable parameter values relating to the configuration of specific network elements (e.g., values that may be modified during run-time operation of a network element and may be used to tune or refine the operation of one or more processes and/or protocols that are being implemented by the network element). For example, optimization control server 240 may receive parameter values relating to the operational state of base stations in wireless network 230, such as values indicating a number of mobile devices attached to a particular base station, congestion at the radio interfaces of the base station, encoding/decoding algorithms being used by the base station, an amount of radio resources required to deliver a particular bandwidth traffic flow to a particular mobile device, average throughput per mobile device, or other values.

Optimization control server 240 may, based on the received performance parameters and the information relating to the state of wireless network 230, determine optimizations to make to wireless network 230. The optimizations may include modifying one or more parameter values of wireless network 230 to affect traffic flows in wireless network 230. For example, optimization control server 240 may determine that quality of service (QoS) parameters associated with various traffic flows should be modified in order to adjust the priority given to different traffic flows. As another example, optimization control server may determine that the bandwidth of certain traffic flows should be adjusted (e.g., a streaming video provided to a mobile device, over a particular traffic flow, may have the bit rate of the encoded video reduced or increased). In general, optimization control server 240 may be designed to potentially control any number of network parameters, or other parameters, that can be used to control traffic flows through wireless network 230. The controlling of the traffic flows may be performed to optimize the use of wireless network 230 (e.g., maximize the utility of wireless network 230 with respect to mobile devices 210).

Optimization enforcer 250 may include one or more computation and communication devices that may act to implement the optimizations determined by optimization control server 240. Optimization enforcer 250 may, for example, control one or more network elements of wireless network 230 (e.g., firewalls, gateways, base stations). As another example, optimization enforcer 250 may communicate with an external server, such as a content provider coupled to PDN 260, to cause the external server to adjust network sessions with one or more mobile devices 210 (e.g., modify the bit rate of a streaming audio or video file). As another example, optimization enforcer 250 may communicate with a mobile device 210 to adjust the operation of the mobile device.

PDN 260 may include one or more packet networks, such as an Internet Protocol (IP)-based packet network. PDN 260 may include a wide area network (WAN), a local area network (LAN), and/or combinations of WANs and LANs. Mobile devices 210 may access PDN 260, through wireless network 230, to obtain computation and/or data services (e.g., streaming video services, file transfer services, etc.) from computing devices, such as from servers connected to PDN 260.

Although optimization control server 240 and optimization enforcer 250 are illustrated, in FIG. 2, as separate elements in environment 200, in some implementations, optimization control server 240 and/or optimization enforcer 250 may be implemented within wireless network 230, within another network, and/or as functionality performed by another network element. Additionally, in other implementations, environment 200 may contain fewer components, different components, differently arranged components, or additional components than those depicted in FIG. 2. Alternatively, or additionally, one or more components of environment 200 may perform one or more other tasks described as being performed by one or more other components of environment 200. For example, in some implementations, the operations performed by optimization enforcer 250 may be performed by optimization control server 240. Additionally, although referred to as a "server," optimization control server 240 may correspond to a traditional server, a cloud-based service, a cluster of blade or rack-mounted servers, or another implementation that provides services and/or data storage.

Figure 3:
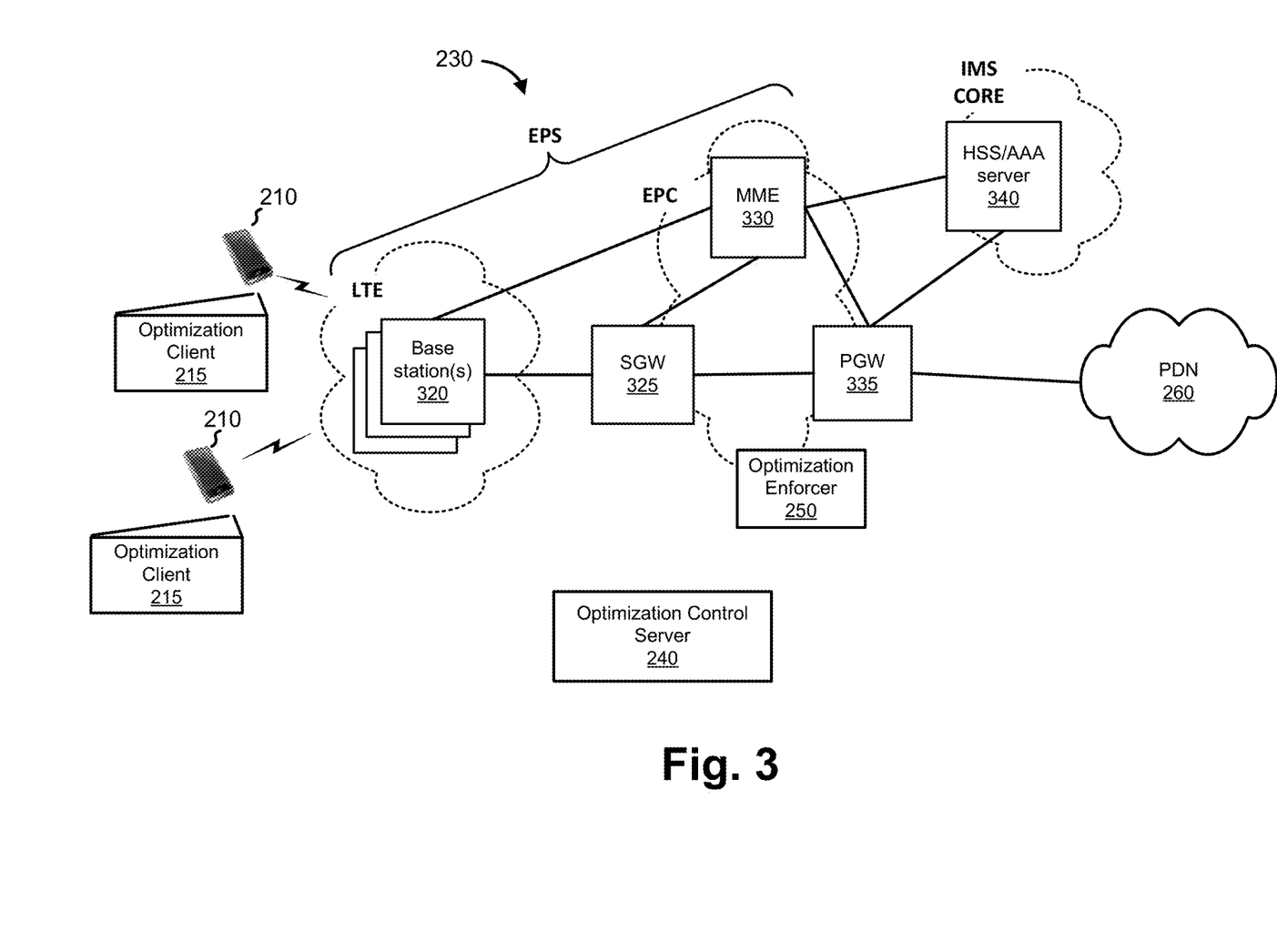
FIG. 3 is a diagram illustrating one example of an implementation of a wireless network in the context of the environment of FIG. 2.

FIG. 3 is a diagram illustrating one example of an implementation of wireless network 230 in the context of environment 200. In FIG. 3, wireless network 230 may include an evolved packet system (EPS) that includes a LTE network and/or an evolved packet core (EPC) network that operates based on a third generation partnership project (3GPP) wireless communication standard. The LTE network may be, or may include, a radio access network that includes one or more base stations 320, some or all of which may take the form of an eNodeB (eNB), via which mobile devices 210 may communicate with the EPC network. The EPC network may include one or more serving gateways (SGWs) 325, mobility management entities (MMEs) 330, and/or packet data network gateways (PGWs) 335, and may enable mobile devices 210 to communicate with an external network, and/or an IP multimedia subsystem ("IMS") core network. The IMS core network may include HSS/AAA server 340, and may manage authentication, session initiation, account information, a user profile, etc. associated with mobile devices 210.

Base station 320 may include one or more network devices that receive, process, and/or transmit traffic destined for and/or received from mobile device 210. In one example, base station 320 may be an eNB device and may be part of the LTE network. Base station 320 may receive traffic from and/or send traffic to external networks, such as PDN 260, via PGW 335. Base station 320 may send traffic to and/or receive traffic from mobile devices 210 via air interfaces.

SGW 325 may include one or more network devices that route and data of a traffic flow. SGW 325 may aggregate traffic received from one or more base stations 320 and may send the aggregated traffic to an external network via PGW 335. SGW 325 may also act as a mobility anchor during inter-base station handovers.

MME 330 may include one or more computation and communication devices that act as a control-node for the LTE access network. For example, MME 330 may perform operations to register a mobile device 210 with the EPS, to establish bearer channels (e.g., traffic flows) associated with a session with mobile device 210, to hand off mobile device 210 from the EPS to another network, to hand off mobile device 210 from the other network to the EPS, and/or to perform other operations. MME 330 may perform policing operations on traffic destined for and/or received from mobile device 210.

PGW 335 may include one or more network devices that may aggregate traffic received from one or more SGWs 325, and may send the aggregated traffic to an external network such as PDN 260. PGW 335 may also, or alternatively, receive traffic from the external network and may send the traffic toward a mobile device 210 via SGW 325, and/or base station 320.

HSS/AAA server 340 may include one or more devices that may manage, update, and/or store, in a memory associated with HSS/AAA server 340, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with mobile device 210. Additionally, or alternatively, HSS/AAA server 340 may perform authentication, authorization, and/or accounting operations associated with the subscriber and/or a communication session with mobile device 210.

As mentioned, optimization control server 240 may act to optimize the performance of wireless network 230 based on information relating to a state of wireless network 230 and based on information received from optimization clients 220 of mobile devices 210. Optimization clients 220 may keep track of and/or maintain values for performance parameters relating to traffic flows corresponding to applications that are being executed by mobile devices 210. The performance parameters may be maintained, by optimization clients 220, on a per-application and/or per-traffic flow basis. For example, an optimization client 220 may measure parameters corresponding to traffic flows associated with mobile device 210 and may associate the traffic flows with applications that use the traffic flow.

Figure 4:
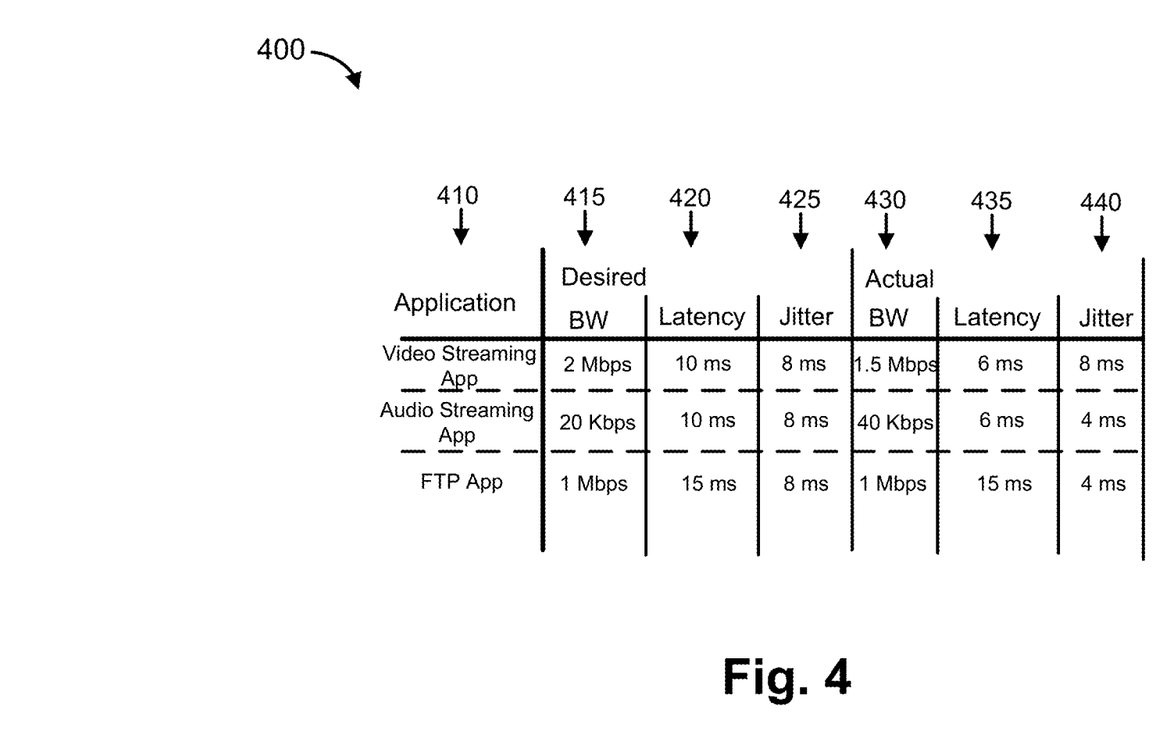
FIG. 4 is a diagram illustrating an example data structure that may be maintained by the optimization clients shown in FIG. 2.

FIG. 4 is a diagram illustrating an example data structure 400, such as a data structure that may be maintained by each of optimization clients 220. Data structure 400 may generally be used to store values of performance parameters for various traffic flows associated with mobile device 210. In the context of an LTE network, a traffic flow may correspond to a dedicated bearer in wireless network 230. As described in further detail below, optimization clients 220 may use data structure 400 when communicating a state of traffic flows, corresponding to executing applications, to optimization control server 240.

As illustrated, each record in data structure 400 may be associated with a particular application. For example, one application ("Video Streaming App") may be a video streaming application that is used to stream videos (including audio) from a server coupled to PDN 260 to mobile device 210; another application ("Audio Streaming App") may be an audio streaming application (e.g., an Internet radio application) that is used to stream music from a server coupled to PDN 260 to mobile device 210; and yet another application ("FTP App") may be an application used to transfer files using the FTP protocol. As illustrated, data structure 400 may store a number of values for each record in data structure 400: application identification field 410, desired bandwidth (BW) field 415, desired latency field 420, desired jitter field 425, actual bandwidth field 430, actual latency field 435, and actual jitter field 440. The fields shown for data structure 400 are examples. In an alternative possible implementation, different, fewer, or additional fields may be implemented.

Application identification field 410 may identify the application corresponding to a particular record in data structure 400. In one implementation, applications may be identified by application type, such as "video streaming application," "FTP application," "audio streaming application," "gaming application," etc. Alternatively or additionally, applications may be identified based on the name and/or publisher of the particular application. In data structure 400, three example applications are shown: a video streaming application, an audio streaming application, and an FTP application.

Applications may be associated with desired performance parameter values, which may represent minimum desirable thresholds for acceptable performance of the application. The desired performance parameters may be specified, for example, by a network operator, a manufacturer of mobile device 210, a user of mobile device 210, or by the application publisher. Three example desired performance parameters are illustrated in data structure 400: a desired bandwidth value (in desired bandwidth field 415), a desired latency value (in desired latency field 420), and a desired jitter value (in desired jitter field 425). For the first record in data structure 400 ("Video Streaming App"), the desired bandwidth is illustrated as two mega-bits per second (Mbps), the desired latency is illustrated as ten milliseconds (ms), and the desired jitter is illustrated as eight ms.

Three example actual performance parameters, corresponding to the desired performance parameters, are also illustrated in data structure 400: an actual bandwidth value (in actual bandwidth field 430), an actual latency value (in actual latency field 435), and an actual jitter value (in actual jitter field 440). The actual performance parameters may be values that are measured or otherwise obtained by optimization client 220 of mobile device 210. For the first record in data structure 400, the actual bandwidth is illustrated as 1.5 Mpbs (i.e., below the desired threshold), the actual latency is illustrated as six ms (i.e., better than the desired threshold) and the actual jitter is illustrated as eight ms (i.e., equal to the desired threshold).

In some implementations, optimization client 220 may measure or otherwise keep track of additional or other performance parameters. For example, optimization client 220 may maintain a performance parameter indicating a current condition of the radio interface with base station 320 (e.g., a modulation coding scheme (MCS) rate, a signal to noise ratio, and/or another metric relating to the condition of the radio interface). Optimization client 220 may also keep track of networking/connection information for each application or traffic flow. For example, for each traffic flow, optimization client may store the source and destination IP address, source and/or destination ports, and the protocol(s) used to implement the traffic flows.

Figure 5A:
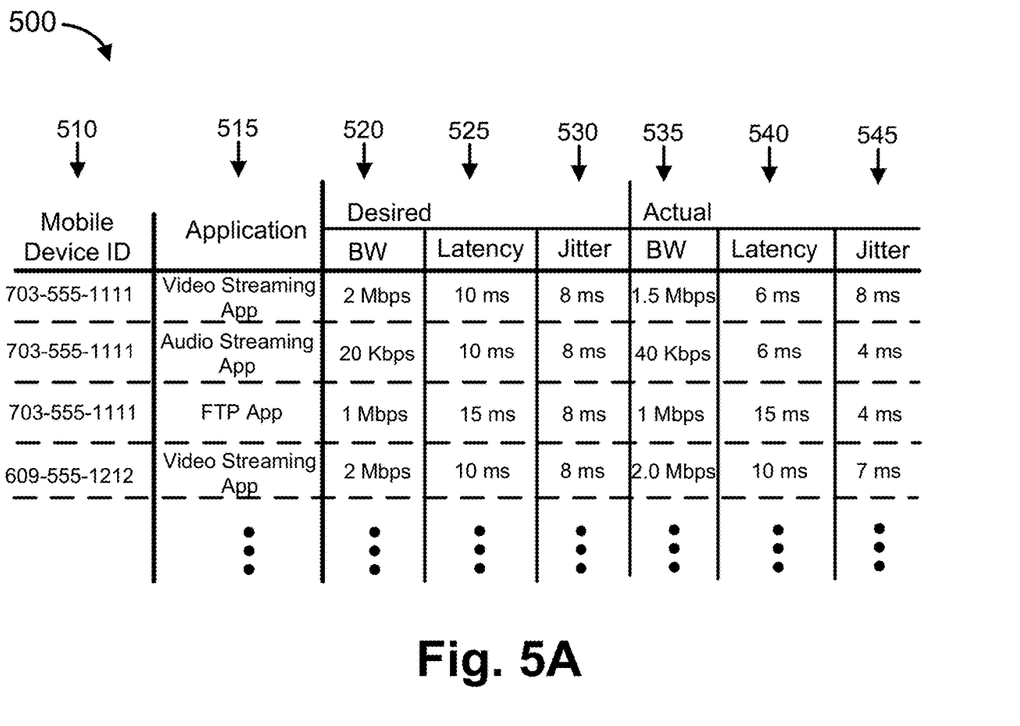
FIGS. 5A and 5B are diagrams illustrating example data structures that may be maintained by the optimization control server shown in FIG. 2.
Figure 5B:
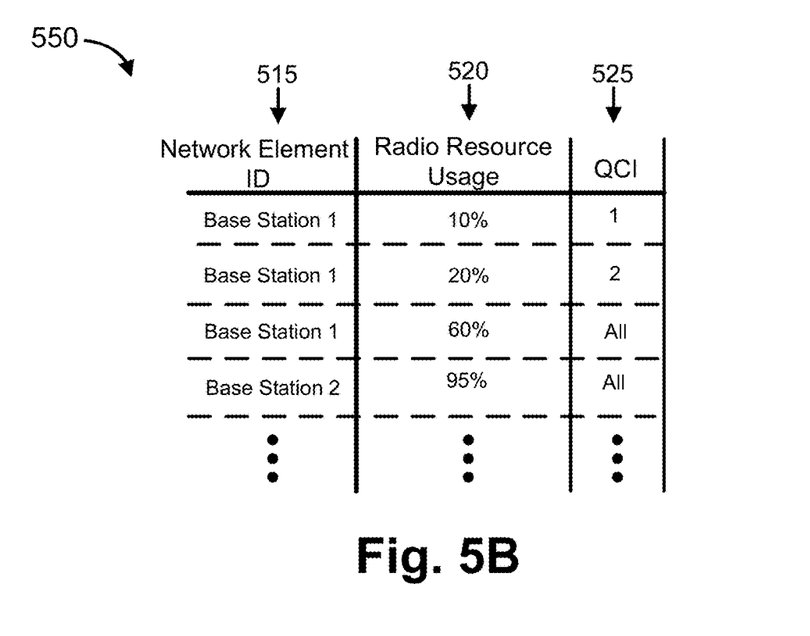

FIGS. 5A and 5B are diagrams illustrating example data structures 500 and 550, respectively, that may be maintained by optimization control server 240. Data structure 500 may generally be used to store performance parameters, received from optimization clients 220 of mobile devices 210. Data structure 550 may be used to store information relating to a state of wireless network 230 (e.g., congestion levels, radio resource usage, etc.). Data structures 500 and 550 may be used by optimization control server 240 when determining potential modifications to wireless network 230. The fields shown for data structures 500 and 550 are examples. In an alternative possible implementation, different, fewer, or additional fields may be implemented.

Data structure 500 may be similar to data structure 400 in that data structure 500 may store performance parameters relating to traffic flows corresponding to applications. Data structure 500, however, may store performance parameters from multiple mobile devices 210. For example, performance parameters may occasionally or periodically be transmitted from optimization clients 220 to optimization control server 240. Optimization control server 240 may store the values of the performance parameters in data structure 500.

Data structure 500 may store, for each record, a number of fields, including: mobile device identification (ID) field 510, application identification field 515, desired bandwidth field 520, desired latency field 525, desired jitter field 530, actual bandwidth field 535, actual latency field 540, and actual jitter field 545.

Mobile device ID field 510 may include a value identifying the mobile device to which the record corresponds (e.g., the mobile device that transmitted the information corresponding to fields 515-545). Mobile device ID field 510 may include, for example, mobile device telephone numbers, mobile device international mobile equipment identity (IMEI) values, a mobile equipment identifier (MEID), or another mobile device identifier. In the example of FIG. 5A, the first three records are illustrated as corresponding to a single mobile device (i.e., a mobile device associated with the telephone number 703-555-1111). The last record may correspond to another mobile device (i.e., a mobile device associated with the telephone number 609-555-1212).

Fields 515-545 of data structure 500 may correspond to fields 410-440, respectively, of data structure 400. As previously mentioned, the values for these fields may be received from the respective mobile devices 210 to which these values relate.

Data structure 550 may store information relating to the state of wireless network 230. In one implementation, data structure 550 may store information relating to radio usage at various base stations 320 in wireless network 230. As illustrated, data structure 550 may include a network element identification (ID) field 515, a radio resource usage field 520, and a Quality of Service (QoS) class of identifier (QCI) field 525. Network element identifier field 515 may store information identifying particular base stations in wireless network 230. The information may include, for example, a network address, hardware identifier, or other information that uniquely identifies particular base stations. Radio resource usage field 520 may store values relating to an amount or portion of the radio resources, of the corresponding base station, that is being used. QCI field 525 may indicate a particular QCI value associated with the corresponding base station and radio resource usage value. Different QCI values may define different sets of transport characteristics. For example, in an LTE network, nine QCI values may be defined (e.g., the integer values 1-9), in which each QCI value corresponds to transport characteristics such as guaranteed/non-guaranteed bit rate, acceptable packet delay, and/or acceptable packet error loss.

In the illustrated example, data structure 550 may include a first record that indicates that the base station "Base Station 1" is using 10% of its radio capacity for traffic flows that have the QCI value of one. Similarly, the second record indicates that "Base Station 1" is using 20% of its radio capacity for traffic flows having the QCI value of two, and the third record indicates that "Base Station 1" is using 60% of its radio capacity for all of the QCI values (i.e., the total radio usage of "Base Station 1" is currently 60% of its capacity). The fourth record in data structure 550 may indicate that another base station, labeled as "Base Station 2," is using 95% of its radio capacity.

Figure 6:
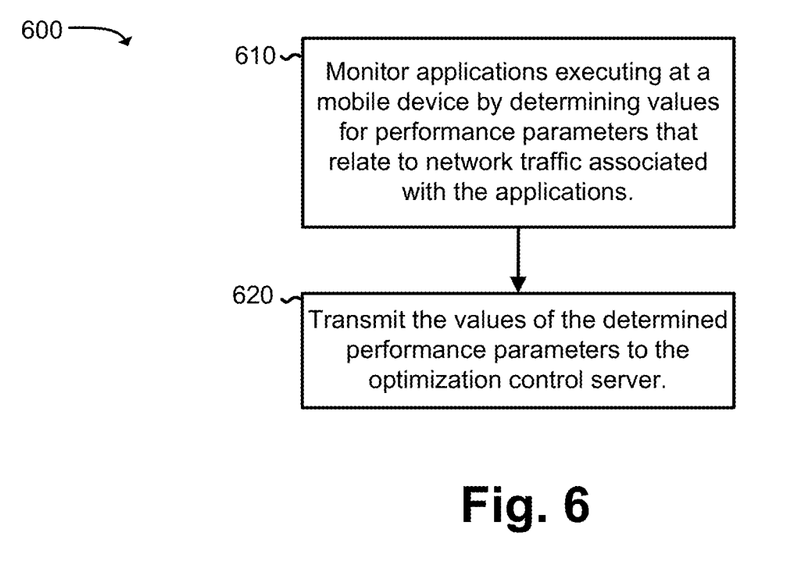
FIG. 6 is flow chart illustrating an example process by which a mobile device may assist in the optimization of a wireless network.

FIG. 6 is flow chart illustrating an example process 600 by which a mobile device may assist in the optimization of a wireless network. Process 600 may be implemented, for example, by optimization client 220.

Process 600 may include monitoring applications executing at the mobile device by determining values for performance parameters that relate to network traffic associated with the applications (block 610). In one implementation, optimization client 220 may be implemented as a middleware or operating system process in mobile devices 210. Optimization client 220 may determine, such as by accessing resources of mobile device 210, analyzing messages received from an attached base station 320, or through an explicit request to the attached base station 320, values for the monitored performance parameters. As previously mentioned, the performance parameters may include parameters relating to the bandwidth, latency, and/or jitter of traffic flows that are being used by the applications. In other implementations, other or additional performance parameters may be monitored. In general, the performance parameters to monitor may be chosen with the goal of determining the quality (with respect to network communications) of the service that is being provided by a particular application. In some implementations, different performance parameters may be monitored for different applications or different types of applications. For example, bandwidth and latency may be particularly relevant performance parameters for evaluating applications that provide video streams, and latency and jitter may be particularly important parameters for evaluating applications that provide two-way audio communications.

Process 600 may further include transmitting the values of the performance parameters to the optimization control server (block 620). In one implementation, the values for the performance parameters (e.g., the performance parameters illustrated in data structure 400) may be periodically or occasionally transmitted to optimization control server 240. Alternatively or additionally, the values for the performance parameters may be transmitted to optimization control server 240 in response to an explicit request from optimization control server 240. In yet another possible implementation, the values for the performance parameters may be transmitted to optimization control server 240 in response to one or more of the performance parameters meeting a specified condition. For example, the values for the performance parameters, corresponding to a particular application, may be transmitted to optimization control server 240 when one or more of the performance parameter values falls below the corresponding desired value (e.g., the actual bandwidth for a particular application falls below the desired bandwidth for the application).

Figure 7:
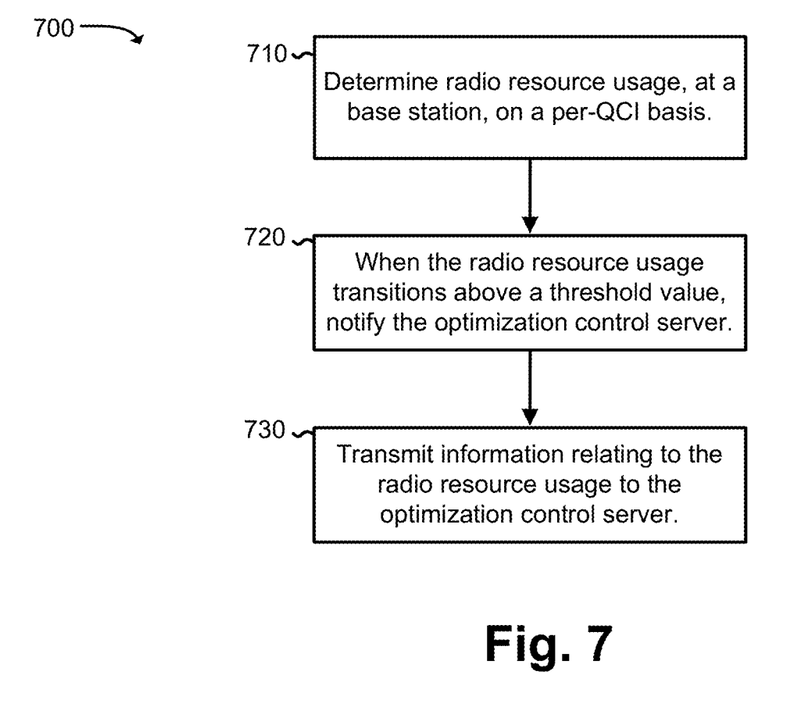
FIG. 7 is flow chart illustrating an example process by which a network element may assist in the optimization of a wireless network.

FIG. 7 is flow chart illustrating an example process 700 by which a network element, such as base station 320, may assist in the optimization of a wireless network. Process 700 may be implemented, for example, by base station 320.

Process 700 may include determining radio resource usage at the base station (block 710). The radio resource usage may, in some implementations, be determined on a per-QCI basis. In this manner, base station 320 may keep track of the spare radio capacity for any particular QCI (or for all QCIs). For example, a base station 320 may determine that the radio resources of the base station are at 100% of capacity (e.g., the base station cannot allocate additional radio resources).

Process 700 may further include, when the radio resource usage transitions above a threshold value, notifying the optimization control server (block 720). For example, the threshold value may be set at 95% of the total radio resources. Alternatively or additionally, separate threshold values may be set for each QCI level. When the actual radio resource usage transitions above the threshold value, this may be an indication that the radio resources of base station 320 are becoming congested. Base station 320 may transmit a message, such as a message indicating the current radio resource usage level(s), to optimization control server 240. As will be described in more detail below, optimization control server 240 may, in response to the message from base station 320, optimizing traffic flows for wireless network 230 (e.g., reduce the bandwidth of the traffic flows through base station 320 to thereby free radio resources at base station 320).

Process 700 may further include transmitting the information relating to the radio resource usage to the optimization control server (block 730). For example, base station 320 may periodically or occasionally transmit the determined radio resource usage information to optimization control server 240. In some implementations, the radio resource usage information may be transmitted in response to an explicit request from optimization control server 240.

Although process 700 is illustrated as including two blocks (blocks 720 and 730) that are associated with transmitting radio resource usage information to optimization control server 240, in some implementations, only one of blocks 720 and 730 may be implemented. For instance, base station 320 may forgo performing one of blocks 720 and 730, while performing the other one of blocks 720 and 730 in some implementations. Additionally, although process 700 was discussed with respect to base station 320 determining and transmitting radio resource usage information, alternatively or additionally, other information relating to the operation or congestion state of base station 320 may be transmitted to optimization control server 240. For example, information relating to a number of attached mobile devices, encoding schemes being used to communicate with the attached mobile devices, transmit radio power required for the attached mobile devices, etc., may additionally be determined and transmitted to optimization control server 240.

Figure 8:
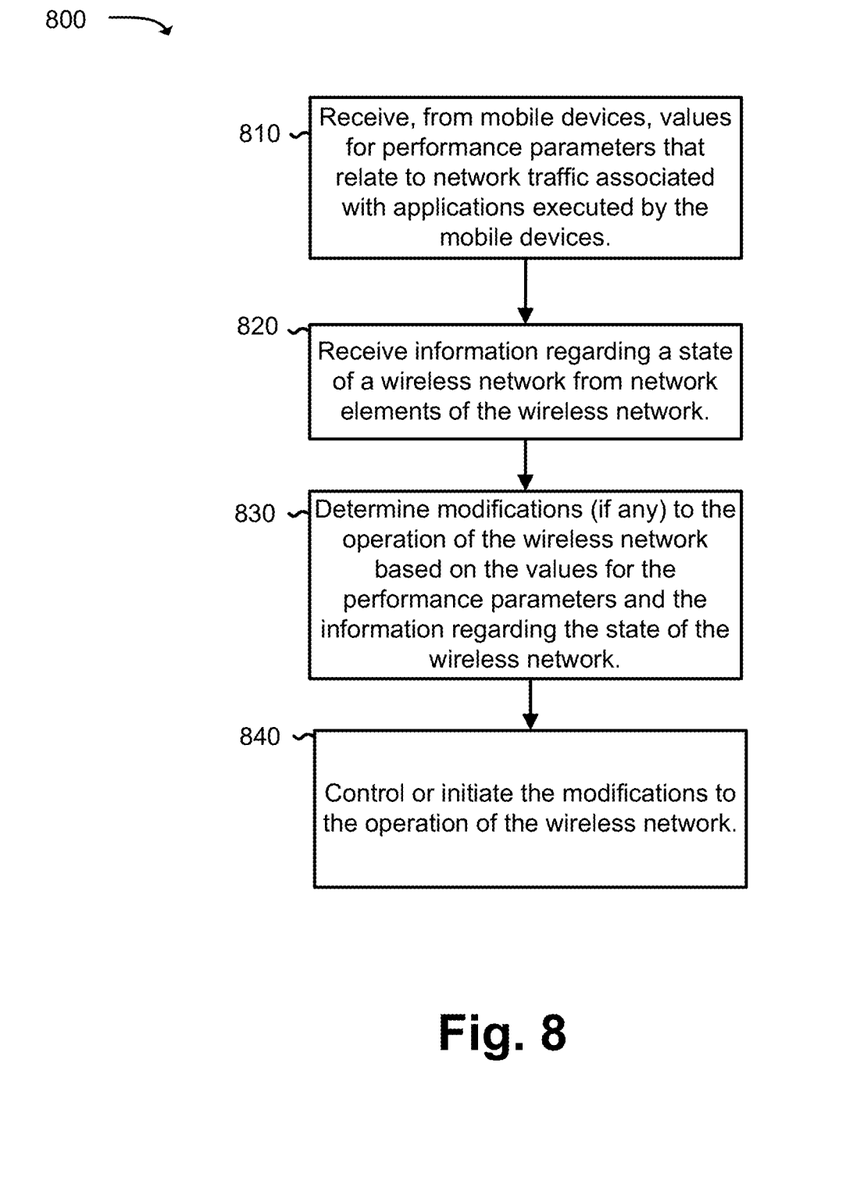
FIG. 8 is flow chart illustrating an example process for optimizing a wireless network.

FIG. 8 is flow chart illustrating an example process 800 for optimizing a wireless network. Process 800 may be implemented, for example, by optimization control server 240 and/or optimization enforcer 250.

Process 800 may include receiving, from mobile devices, values for performance parameters that relate to network traffic associated with applications executed by the mobile devices. For example, as previously discussed, optimization clients 220, associated with mobile devices 210, may transmit values for performance parameters (e.g., bandwidth, latency, and jitter) on a per application basis. Optimization control server 240 may receive and store the values (e.g., in data structure 500). Alternatively or additionally, optimization control server 240 may query optimization clients 220 to obtain performance parameter values associated with a particular mobile device 210.

Process 800 may further include receiving information regarding a state of a wireless network from network elements of the wireless network (block 820). For example, optimization control server 240 may obtain values relating to network congestion or latency, or values defining tunable parameters relating to the configuration of wireless network 230. The network elements may include, for example, base stations 320, SGWs 325, MMEs 330, PGWs 335, routers, switches, or other network elements. As discussed previously with reference to FIG. 7, in one implementation, the information regarding the state of wireless network 230 may include information describing radio resource usage at base stations 320.

Process 800 may further include determining modifications to the operation of the wireless network based on the values for the performance parameters and based on the information regarding the state of the wireless network (block 830). In one implementation, optimization control server 240 may determine modifications to optimize traffic flows in wireless network 230 with respect to the performance parameters associated with the applications being executed by mobile devices 210. For example, optimization control server 240 may, based on an analysis of data structure 500 (e.g., by comparing actual application performance parameter values to desired application performance parameter values), determine which applications are experiencing actual performance parameter values that are below the application's desired performance parameter values. Optimization control server 240 may then determine modifications to wireless network 230 to potentially minimize the amount or number of applications that are receiving traffic flows that are below the corresponding desired performance parameter values.

In some implementations, optimization control server 240 may thus determine operations to wireless network 230 on a per-application basis. Potential modifications to wireless network 230 may include modifications to scheduling algorithms (e.g., at base stations 320 or at other network elements), modifications to radio encoding/decoding schemes that are being used by base stations 320, modifications to the transmitted bit rates of streaming video or audio files, or modifications to other parameters relating to network elements and/or traffic flows in wireless network 230.

As one example of modifications that may be determined for wireless network 230, optimization control server 240 may modify the bit rate of various traffic flows, associated with a base station 320, when the radio resource usage of the base station exceeds a threshold. For example, when the radio resource usage of a particular base station exceeds a threshold (e.g., either a threshold for traffic flows associated with a particular QCI or a threshold for all traffic of the particular base station), optimization control server 240 may cause a reduction in the bit rate of one or more of the traffic flows being handled by the particular base station (e.g., all traffic flows associated with a particular QCI, all traffic flows associated with a particular application, a subset of the traffic flows associated with the particular application, etc.). Optimization control server 240 may, for instance, directly reduce the bit rate of the one or more traffic flows by communicating with a corresponding content server of the traffic flows. Alternatively, optimization control server 240 may indirectly reduce the bit rate of the one or more traffic flows by reducing the radio resources devoted to each of the one or more traffic flows (e.g., by reducing the radio transmit power) or by limiting the bandwidth for each of the one or more traffic flows at another network element (e.g., PGW 335). As another example, optimization control server 240 may notify a mobile device 210 to request, from the content server, that the bit rate be reduced. This may indirectly cause the content server associated with the one or more traffic flows to receive feedback that indicates an increase in dropped packets, which may cause the content server to reduce the transmitted bit rate of the one or more traffic flows.

In some implementations, the operation of block 830 may be performed, by optimization control server 240, each time performance parameter values are received from a mobile device. Alternatively or additionally, the operation of block 830 may perform at other times (e.g., periodically or intermittently) or in response to the occurrence of trigger events (e.g., a base station signaling that its radio interface is congested).

Process 800 may further include controlling or initiating modifications to the operation of the wireless network (block 840). Optimization control server 240 may, for example, directly communicate with network elements in wireless network 230 to implement the determined modifications. Alternatively or additionally, optimization enforcer 250 may be responsible for implementing the determined modifications. In this situation, optimization control server 240 may transmit indications of the modifications to optimization enforcer 250, which may control network elements in wireless network 230 and/or may directly receive and operate upon traffic flows in wireless network 230.

Figure 9:
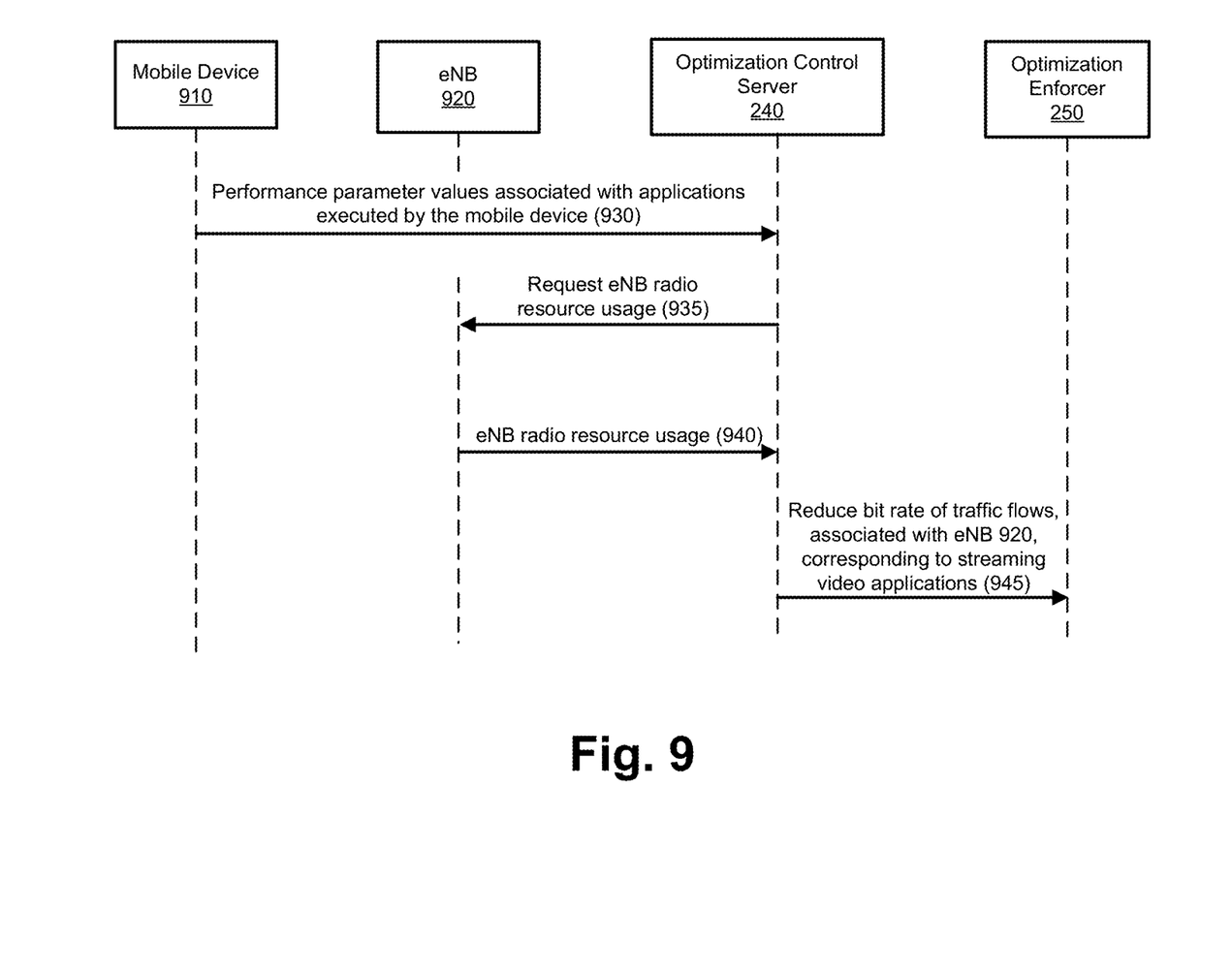
FIG. 9 is a diagram illustrating an example signal flow relating to optimization of a wireless network.

FIG. 9 is a diagram illustrating an example signal flow relating to optimization of a wireless network. In this example, the wireless network may include an LTE network.

As shown in FIG. 9, the devices involved in the signal flow may include mobile device 910, eNB 920, optimization control server 240, and optimization enforcer 250. Mobile device 910 may be similar to mobile device 210, and eNB 920 may represent a base station (e.g., base station 320) in the LTE network.

Mobile device 910 may monitor applications executing at the mobile device and may determine values for performance parameters that relate to network traffic associated with the applications. The performance parameter values may be transmitted to optimization control server 240 (communication 930). As previously mentioned, the performance parameters may include, for example, parameters that describe the actual bandwidth, latency, and/or jitter of traffic flows that are used by particular applications. In some implementations, mobile device 910 may also transmit an indication of desired or minimum acceptable values of the performance parameters.

In the example illustrated in FIG. 9, optimization control server 240 may explicitly request radio resource usage information from eNB 920 (communication 935). eNB 920 may respond with information relating to the radio resource usage at eNB 920 (communication 940). Communication 940 may, for example, include information similar to that illustrated in data structure 550. In an alternative possible implementation, optimization control server 240, instead of requesting radio resource usage information from eNB 920, may receive the radio resource usage information from eNB 920 based on eNB 920 transmitting the radio resource usage information in response to a trigger event (e.g., the radio resources of eNB 920 reaching a threshold level of use). That is, in some implementations, eNB 920 may transmit the radio resource usage information independently of any requests received from optimization control server 240 (e.g., without having received such a request).

In addition to the radio resource usage information that is received from eNB 920, optimization control server 240 may maintain or obtain other information relating to eNB 920, such as a list of the mobile devices that are connected to eNB 920 and/or traffic flows (IP flows) being handled by eNB 920.

Optimization control server 240 may identify one or more traffic flows that can be optimized (e.g., as discussed previously with respect to block 830 of FIG. 8). For example, in response to the radio resource usage of eNB 920 exceeding a threshold, optimization control server 240 may determine to reduce a bit rate associated with all (or a subset of) the video streaming applications that are currently being executed by mobile devices attached to eNB 920. Optimization control server 240 may transmit a command to optimization enforcer 250 to reduce the bit rate of the traffic flows, associated with eNB 920, corresponding to the video streaming applications (command 945). The command may include, for example, an identification of the traffic flows (e.g., by IP address and port number or protocol) and the new bit rate for the identified traffic flows.

Optimization enforcer 250 may act to enforce the command from optimization control server 240. For example, as mentioned above, optimization enforcer 250 may control one or more network elements of wireless network 230 (e.g., firewalls, gateways, base stations). In some implementations, after a certain time period, or when the radio resource usage level at eNB 920 falls below a second threshold, optimization control server 240 may fully or partially revert the enforcement modifications of command 945, such as by increasing the bit rate of the traffic flows back to the level before communication 945 was issued.

Figure 10:
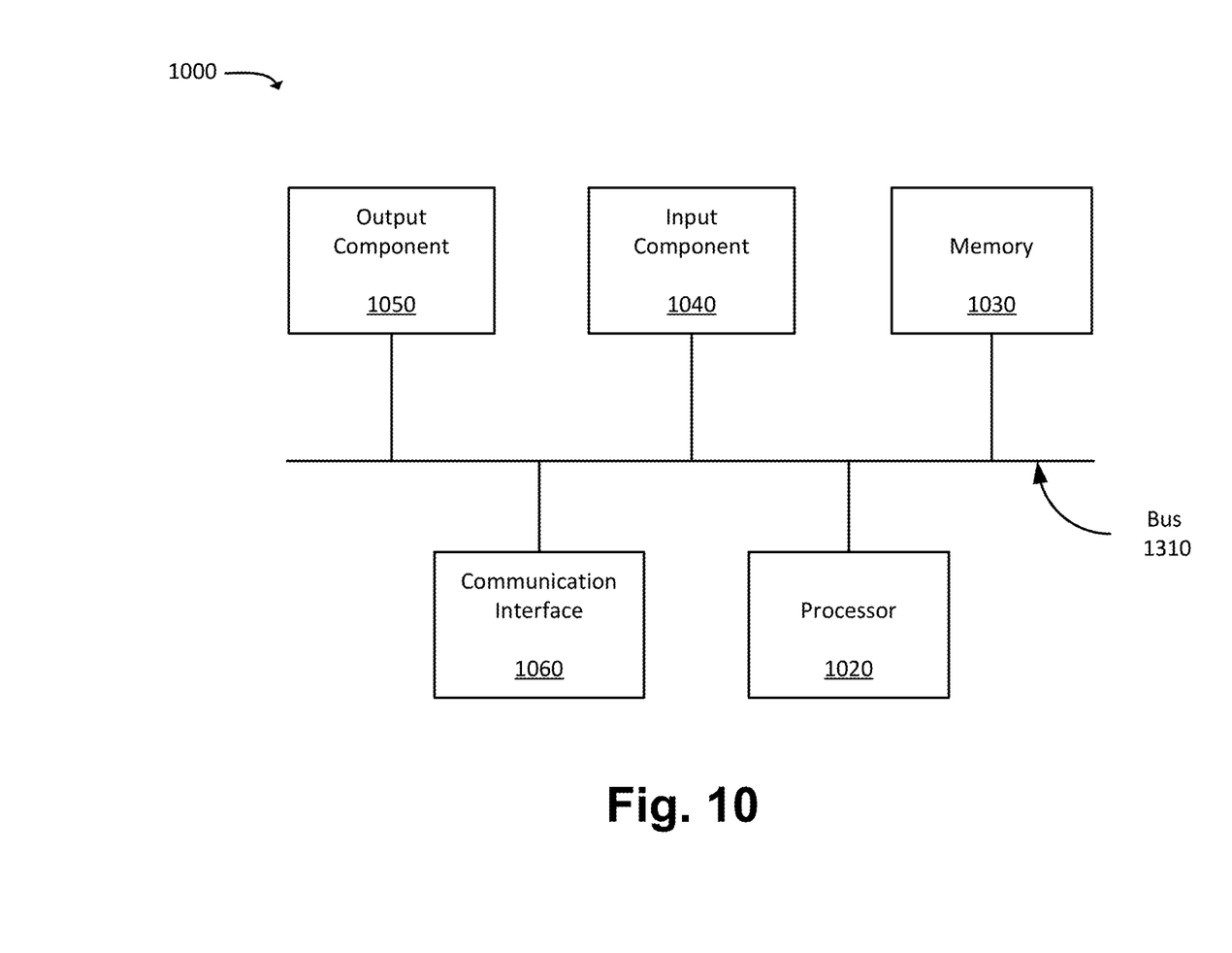
FIG. 10 is a diagram of example components of a device.

FIG. 10 is a diagram of example components of a device 1000. Each of the devices illustrated in FIGS. 1-3 and 9 may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks and/or signals have been described with regard to FIGS. 6 and 9, the order of the blocks and/or signals may be modified in other implementations. Further, non-dependent blocks and/or signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
receiving, by one or more computing devices, a plurality of threshold values of performance metrics of traffic flows associated with a plurality of types of applications executing at a plurality of mobile devices attached to a wireless network, wherein the threshold values associated with a particular application type are determined based on a monitoring of execution of the particular application type at one or more of the mobile devices, wherein the threshold values are determined on a per-application type basis, the plurality of threshold values including at least:
 a first set of threshold values for a first set of performance metrics associated with a first application type, and
 a second set of threshold values for a second set of performance metrics associated with a second application type,
 the first and second sets of performance metrics including different types of performance metrics;
receiving, by the one or more computing devices and from network elements in the wireless network, measured values of the first and second sets of performance metrics;
determining, by the one or more computing devices, whether the respective performance metrics for the first application type and the second application type are met, the determining including:
 comparing the received measured values of the first set of performance metrics to the first set of threshold values, and
 comparing the received measured values of the second set of performance metrics to the second set of threshold values;
determining, based on the comparing and by the one or more computing devices, that one or more threshold values of one or more performance metrics, included in the first set of performance metrics associated with the first application type, are not met;

determining, by the one or more computing devices, based on determining that the one or more threshold values of the one or more performance metrics included in the first set of performance metrics are not met, modifications to an operation of the wireless network to optimize transmission of traffic flows in the wireless network with respect to the first application type; and controlling, by the one or more computing devices, one or more of the network elements in the wireless network to implement the determined modifications to the operation of the wireless network.

2. The method of claim 1, wherein:

the first set of threshold values includes a first threshold value associated with a bandwidth performance metric and a second threshold value associated with a latency performance metric, and the second set of threshold values includes a third threshold value associated with the latency performance metric and a fourth threshold value associated with a jitter performance metric.

3. The method of claim 2, wherein the measured values of the first and second sets of performance metrics are based on radio resource usage at a base station of the wireless network.

4. The method of claim 3, wherein the radio resource usage at the base station of the wireless network is quantified on a per Quality of Service (QoS) Class of Identifier (QCI) basis.

5. The method of claim 3, wherein the modifications to the operation of the wireless network include:

modifications to reduce a bit rate of a set of traffic flows, of the traffic flows associated with one or more applications, that pass through the base station and that are associated with the first application type.

6. The method of claim 1, further comprising:

receiving a message, from a base station in the wireless network, indicating that a radio resource usage level of the base station is above a threshold value;

wherein the determination of the modifications to the operation of the wireless network further includes:

determining the modifications to reduce the radio resource usage level of the base station.

7. The method of claim 6, wherein the modifications to the operation of the wireless network are selected to affect traffic flows of particular applications associated with the first application type being executed by the mobile devices.

8. A device comprising:

a memory to store instructions; and at least one processor to execute the instructions stored by the memory to:

receive a plurality of threshold values of performance metrics of traffic flows associated with a plurality of types of applications executing at a plurality of mobile devices attached to a wireless network, wherein the threshold values associated with a particular application type are determined based on a monitoring of execution of the particular application type at one or more of the mobile devices, wherein the threshold values are determined on a per-application type basis, the plurality of threshold values including at least:

a first set of threshold values for a first set of performance metrics associated with a first application type, and a second set of threshold values for a second set of performance metrics associated with a second application type, the first and second sets of performance metrics including different types of performance metrics;

receive measured values of the first and second sets of performance metrics associated with the wireless network;

determine whether the respective performance metrics for the first application type and the second application type are met, the determining including:

compare the received measured values of the first set of performance metrics to the first set of threshold values, and comparing the received measured values of the second set of performance metrics to the second set of threshold values;

determine, based on the comparing, that one or more threshold values of one or more performance metrics, included in the first set of performance metrics associated with the first application type, are not met;

determine, based on determining that the one or more threshold values of the one or more performance metrics included in the first set of performance metrics are not met, modifications to an operation of the wireless network to optimize transmission of traffic flows in the wireless network with respect to the first application type; and control one or more elements of the wireless network to implement the determined modifications to the operation of the wireless network.

9. The device of claim 8, wherein:

the first set of threshold values include threshold values associated with bandwidth and latency performance metrics, and the second set of threshold values include threshold values associated with latency and jitter performance metrics.

10. The device of claim 9, wherein the measured values of the first and second sets of performance metrics are based on radio resource usage at a base station of the wireless network.

11. The device of claim 10, wherein the radio resource usage at the base station of the wireless network is quantified on a per Quality of Service (QoS) Class of Identifier (QCI) basis.

12. The device of claim 10, wherein the modifications to the operation of the wireless network include:

modifications to reduce a bit rate of a set of traffic flows, of the traffic flows associated with one or more applications, that pass through the base station and that are associated with the first application type.

13. The device of claim 8, wherein the at least one processor is further to:

receive a message, from a base station in the wireless network, indicating that a radio resource usage level of the base station is above a threshold value;

wherein the determination of the modifications to the operation of the wireless network further includes:

determining the modifications to reduce the radio resource usage level of the base station.

14. The device of claim 13, wherein the modifications to the operation of the wireless network are selected to affect traffic flows of particular applications associated with the first application type being executed by the mobile devices.

15. A non-transitory computer readable medium containing program instructions for causing one or more processors to:
- receive a plurality of threshold values of performance metrics associated with a plurality of types of applications, wherein the threshold values associated with a particular application type are determined based on a monitoring of execution of the particular application type at one or more mobile devices, wherein the threshold values are determined on a per-application type basis, the plurality of threshold values including:
  - a first set of threshold values for a first set of performance metrics associated with a first application type, and
  - a second set of threshold values for a second set of performance metrics associated with a second application type,
  - the first and second sets of performance metrics including different types of performance metrics;
- receive measured values of the first and second sets of performance metrics associated with a wireless network;
- compare the received measured values of the first set of performance metrics to the first set of threshold values;
- compare the received measured values of the second set of performance metrics to the second set of threshold values;
- determine, based on the comparing, that one or more threshold values of one or more performance metrics, included in the first set of performance metrics associated with the first application type, are not met;
- determine, based on determining that the one or more threshold values of the one or more performance metrics included in the first set of performance metrics are not met, modifications to an operation of the wireless network with respect to the first application type; and
- control one or more elements of the wireless network to implement the determined modifications to the operation of the wireless network.

16. The non-transitory computer readable medium of claim 15, wherein:
- the first set of threshold values are associated with bandwidth and latency performance metrics, and
- the second set of threshold values are associated with latency and jitter performance metrics.

17. The non-transitory computer readable medium of claim 15, wherein the program instructions further cause the one or more processors to:
- receive a message, from a base station in the wireless network, indicating that a radio resource usage level of the base station is above a threshold value;
- wherein the determination of the modifications to the operation of the wireless network further includes:
  - determining the modifications to reduce the radio resource usage level of the base station.

18. The non-transitory computer-readable medium of claim 15, wherein the first and second threshold values are specified on a per Quality of Service (QoS) Class of Identifier (QCI) basis.

19. The non-transitory computer-readable medium of claim 15, wherein the program instructions to control the one or more elements of the wireless network include instructing the one or more elements to reduce a bit rate of traffic, handled by the one or more elements, associated with the first application type.

20. The non-transitory computer-readable medium of claim 15, wherein the first and second sets of performance metrics include at least one particular performance metric of a same type,
- wherein the first set of threshold values includes a first threshold value for the particular performance metric, and
- wherein the second set of threshold values includes a second threshold value for the particular performance metric, the first and second threshold values being different.

* * * * *